United States Patent
Saint Etienne et al.

(10) Patent No.: US 7,362,755 B2
(45) Date of Patent: *Apr. 22, 2008

(54) PROCESS FOR IMPLEMENTING A SWITCHED FULL-DUPLEX ETHERNET TYPE COMMUNICATION NETWORK WITH REDUNDANCY

(75) Inventors: Jean-Francois Saint Etienne, Cugnaux (FR); Juan Lopez, Toulouse (FR); Dominique Portes, Auzeville-Tolosane (FR); Eddie Gambardella, Blagnac (FR); Bruno Pasquier, Thil (FR); Philippe Almeida, Cugnaux (FR)

(73) Assignee: Airbus France S.A.S., Toulouse Cedex (FR)

( * ) Notice: Subject to any disclaimer, the term of this patent is extended or adjusted under 35 U.S.C. 154(b) by 867 days.

This patent is subject to a terminal disclaimer.

(21) Appl. No.: 10/717,546

(22) Filed: Nov. 21, 2003

(65) Prior Publication Data
US 2004/0160944 A1    Aug. 19, 2004

Related U.S. Application Data

(63) Continuation of application No. 10/287,959, filed on Nov. 4, 2002.

(30) Foreign Application Priority Data
Nov. 5, 2001   (FR) .................................. 01 14264

(51) Int. Cl.
*H04L 12/28* (2006.01)

(52) U.S. Cl. ...................... 370/389; 370/218; 370/221; 714/4; 714/6; 714/11

(58) Field of Classification Search ................ 370/226, 370/389, 221, 224, 228; 714/4, 6, 11, 717
See application file for complete search history.

(56) References Cited

U.S. PATENT DOCUMENTS

| | | | | |
|---|---|---|---|---|
| 4,780,869 | A * | 10/1988 | Engdahl et al. | 370/228 |
| 5,379,278 | A * | 1/1995 | Safadi | 370/221 |
| 6,188,689 | B1 * | 2/2001 | Katsube et al. | 370/389 |
| 6,282,669 | B1 * | 8/2001 | Imanaka et al. | 714/4 |
| 6,766,482 | B1 * | 7/2004 | Yip et al. | 714/717 |
| 6,823,453 | B1 * | 11/2004 | Hagerman | 713/168 |
| 2003/0147377 | A1 | 8/2003 | Saint Etienne et al. | |
| 2006/0107108 | A1 * | 5/2006 | Geng et al. | 714/11 |

\* cited by examiner

*Primary Examiner*—Chi Pham
*Assistant Examiner*—Albert T. Chou
(74) *Attorney, Agent, or Firm*—Oblon, Spivak, McClelland, Maier & Neustadt, P.C.

(57) ABSTRACT

A process for implementing a redundant switched full-duplex Ethernet type communication network including at least two independent elementary networks, each elementary network including at least one source subscriber equipment and at least one destination subscriber equipment, connected to each other through at least one physical link through at least one switch, each equipment being connected to each of these elementary networks. The process performs a frame by frame redundancy on each elementary network.

16 Claims, 3 Drawing Sheets

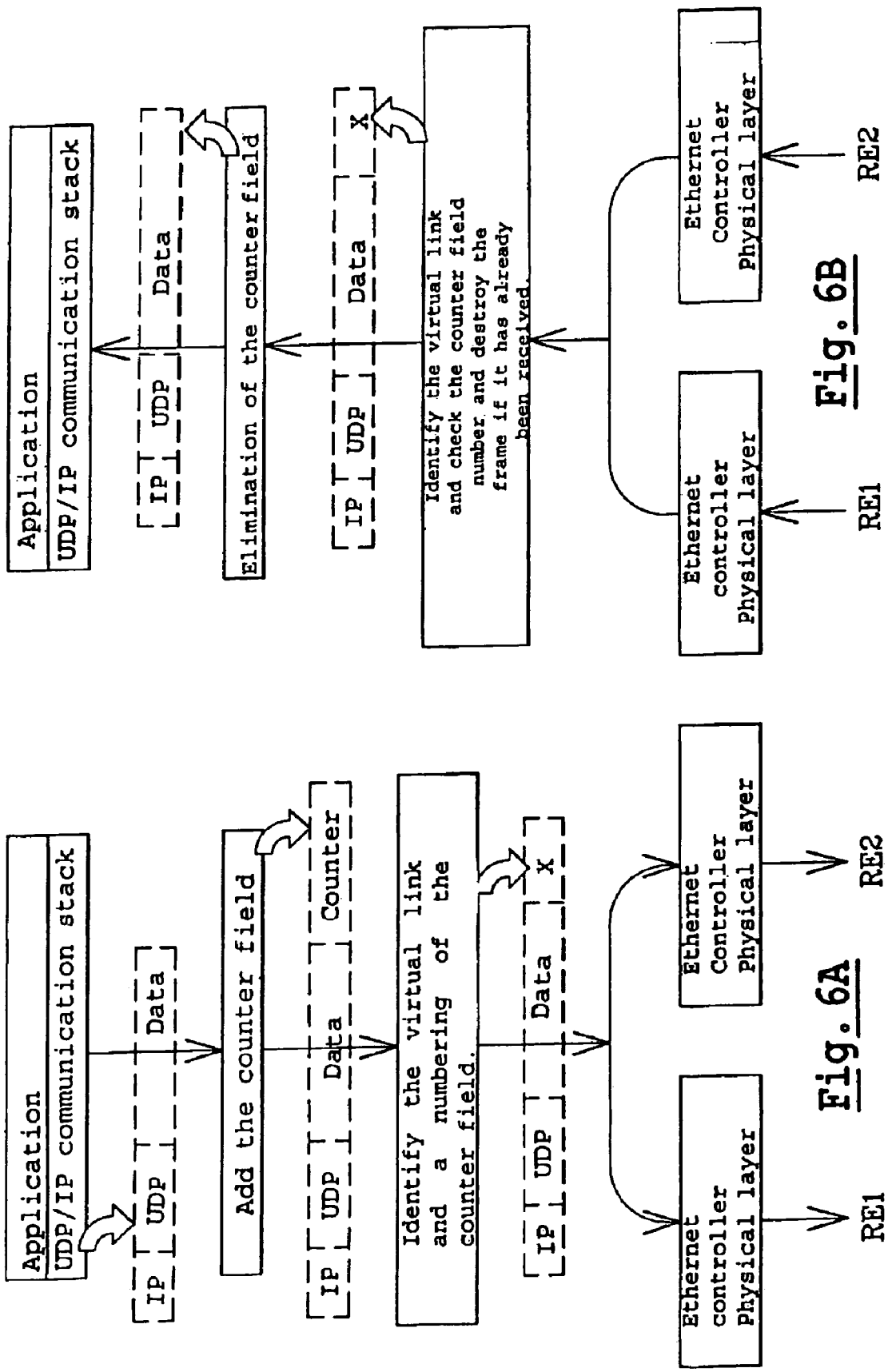

PROCESS FOR IMPLEMENTING A SWITCHED FULL-DUPLEX ETHERNET TYPE COMMUNICATION NETWORK WITH REDUNDANCY

CROSS-REFERENCE TO RELATED APPLICATIONS

The present patent document is a continuation of U.S. application Ser. No. 10/287,959 filed on Nov. 4, 2002, and claims priority on French patent application FR 01 14264 filed on Nov. 5, 2001, the entire contents of each of which are hereby incorporated herein by reference.

BACKGROUND OF THE INVENTION

1. Field of the Invention

This invention relates to a process for implementation of a redundant switched full-duplex Ethernet type communication network, particularly in avionics.

2. Description of the Related Art

The Ethernet network, which is the reference in the world of communication networks, can be used to send data in digital form by packets or "frames", where a frame is defined as being a set of data sent in a single step on the network.

In an Ethernet network, the data in each frame are not interpreted. The network carries the data without understanding their meaning. A frame is composed of two types of data, network data that are used to route the frame to its correct destination, and useful data which comprise the "useful load" in the frame.

An Ethernet network is composed of different equipment that is subscribed to the network, and connected to each other through a communication means formed of active equipment called switches, which perform three functions:

connect network subscribers in point to point mode through physical links, which are physical supports for messages to be exchanged, for example twisted pair cables, route (switch) frames sent by source equipment to one or more destination equipment, check the integrity and the format of the Ethernet frame.

FIG. 1 illustrates an Ethernet network composed of two switches 11 interconnected to each other and each connected to three items of subscriber equipment 12 in point to point mode.

Operation of such a network is simple. Each network subscriber can send frames in digital form at any time towards one or several other subscribers. When a switch receives the frames, the "network information" data are analyzed to determine the destination equipment. The frames are then switched towards this equipment.

In the "switched full-duplex Ethernet type network" expression:

the "full-duplex" term means that the subscriber can send and receive frames at the same time on the same link, the "switched" term means that the frames are switched in switches on appropriate outputs.

For example, this network may be a 100 Mbits/s switched full duplex type network on twisted pair; the term "twisted pair" means that connections between the equipment and the switches are composed of two pairs of cables, each pair being twisted; the term 100 Mbits/s simply means the transmission or reception speed of frames on the network.

The Ethernet technology imposes:

a minimum size and a maximum size on the frames, an identification of the source and/or the destination(s) in each frame, a CRC ("Cyclic Redundancy Check") that checks the integrity of the transported data.

At the present time, in the civil aeronautics field, data exchanges between the various onboard computers are based on the use of the ARINC 429 aeronautical standard.

However, the switched full-duplex Ethernet network is frequently used in industry. The emergence of new communication technologies shows that this type of network is an open and standard solution (IEEE standard 802.3) with a considerable potential for development as a local network. But this type of solution does not provide any means of guaranteeing segregation and transfer performances (in terms of throughput, latency, etc.) necessary for avionics applications.

The purpose of this invention is to improve the availability of such a network, by providing means of protecting against the loss of a link or a switch, to enable its use in avionics.

In general, in a distributed control system, the communication system is made redundant so that each node in a set of nodes (equipment) can be controlled from one of these nodes, and so that these nodes can be connected so as to increase the load factor on the system and therefore its efficiency.

A European patent application EP-0 854 610 describes an Ethernet communication redundancy process between a set of nodes forming such a distributed control system. These nodes are connected to each other in duplex through communication lines in a first and a second Ethernet network, that are independent from each other. At the transmission end, a first node transmits identical data on communication lines in the first and the second networks, a data identifier being added to the transmitted data. A second node at the reception end determines which of the identical data received from the first node through communication lines in the first and the second networks arrived first and uses it as the reception data. The second data are then rejected if they are identical to the first data.

Unlike the process described in this patent application which is applicable to data, the purpose of the invention is to make a process enabling frame by frame redundancy.

SUMMARY OF THE INVENTION

The invention relates to a process for implementing redundant switched full-duplex Ethernet type communication network including at least two independent elementary networks, each including at least one source subscriber equipment and at least one destination subscriber equipment, connected to each other through at least one physical link and through at least one switch, each equipment being connected to each elementary network. The process performs a frame by frame redundancy on each elementary network.

This process comprises in transmission:

adding a numbering field in each transmitted frame, to insert a frame number, and sending this frame on each of the elementary networks.

It includes on reception:

storing the received frame number, accepting this frame only if its number has not already been received.

Advantageously, the accepting of a frame takes place during a given time window.

In one advantageously embodiment, the virtual link concept is used, which is a conceptual view of a link from one source equipment to at least one destination equipment. A virtual link number is accepted in the numbering field of each transmitted frame. A virtual link is characterized by:
- a transfer direction, the virtual link being single directional,
- a source equipment,
- one or several items of destination equipment,
- a fixed passband,
- a maximum guaranteed time for transfer of packets from a source equipment to a destination equipment,
- a path fixed on the network,
- a unique identifier.

Advantageously, the process according to the invention can be used for implementing a redundant switched full-duplex Ethernet type communication network in avionics.

This type of network redundancy, which may for example include doubling up the network, with each subscriber being connected to each of the two networks, one of the two packets being selected on reception, can increase the network availability; the network will continue to operate if it has one or several defective switches or links.

The invention can achieve redundancies of order 2 or more, independently of the communication stack and applications.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 6A and 6B illustrate operation of the process according to the invention in transmission mode and in reception mode respectively.

DETAILED DESCRIPTION OF EMBODIMENTS

The invention relates to a process for the implementation of a redundant switched full-duplex Ethernet type communication network comprising at least 2 elementary networks each of which comprises at least one source subscriber equipment and at least one destination subscriber equipment connected to each other through at least one physical link. In the remainder of the description, we will consider two elementary networks RE1 and RE2 as a non-limiting example. This process makes a frame by frame redundancy on each of the elementary networks.

In transmission, it comprises:
- adding a numbering field in each transmitted frame, to insert a frame number so that each frame can be identified in time,
- sending this frame on each of the elementary networks.

In reception, it comprises:
- storing the received frame number,
- accepting this frame only if its number has not already been received.

Advantageously, the frame acceptance step only takes place during a given time window, so that only a limited memory size can be used, each frame number reappearing after a determined time.

Therefore, the process according to the invention only sends the first frame received from an elementary network, to the application considered, the other corresponding frames from other elementary networks being rejected.

Figure 5:
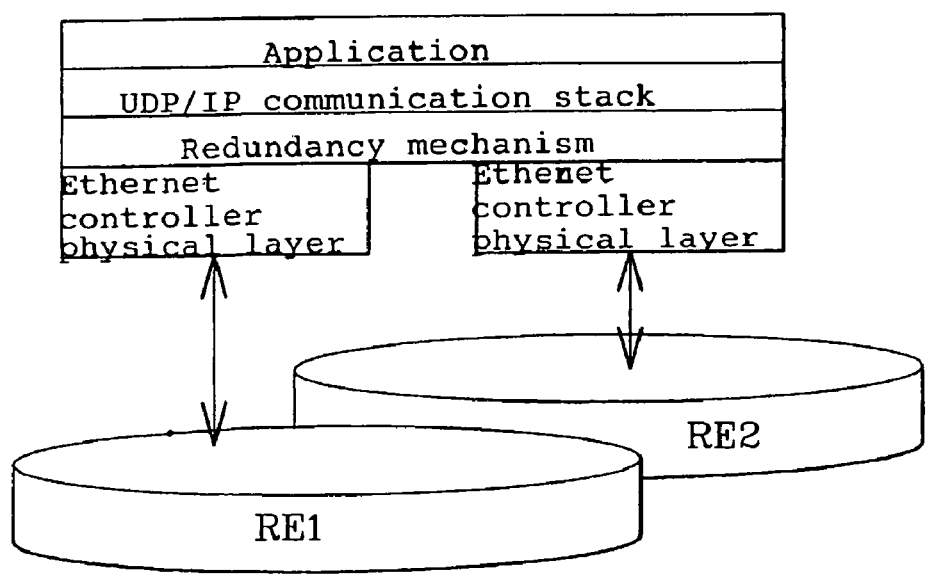
FIG. 5 illustrates an example of second order redundancy in subscribed equipment according to the invention.

FIG. 5 illustrates an example of a second order redundancy used in a subscriber equipment.

In one advantageous embodiment, the process according to the invention uses the virtual link concept to limit the end to end transfer time, in other words source equipment towards one or several destination equipment.

Figure 1:
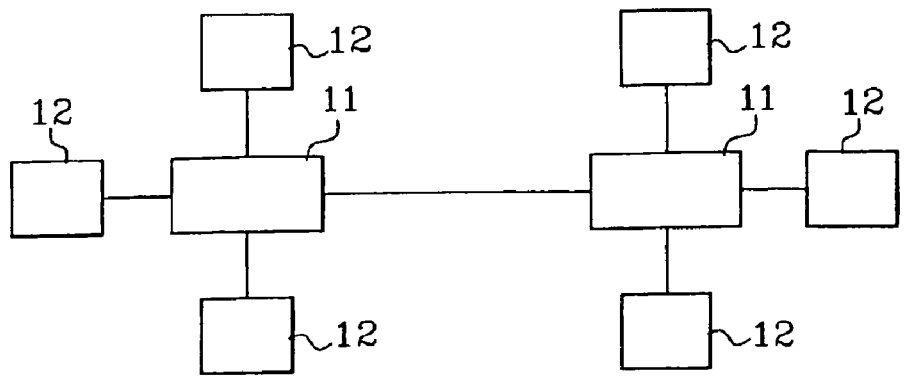
FIG. 1 illustrates an Ethernet network according to known art.
Figure 2:
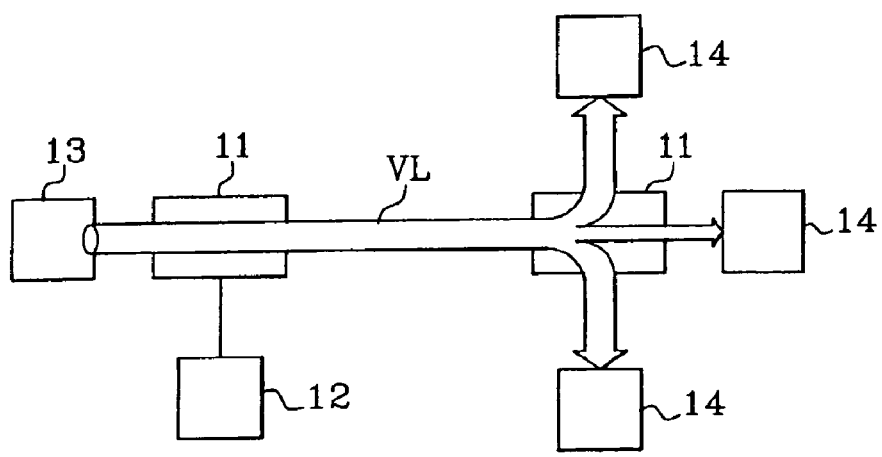
FIG. 2 illustrates the concept of a virtual link in an Ethernet network according to known art.

This virtual link (VL) concept provides means of isolating data transfers between a source equipment 13 and destination equipment 14. A virtual link VL is seen as a "pipe" on the network, as illustrated in FIG. 2.

A virtual link VL is characterized by:
- a transfer direction, the virtual link being single directional,
- a single source equipment 13,
- one or several destination equipment 14,
- a fixed passband (maximum number of packets and their size per second),
- a maximum guaranteed time for transfer of packets from a source equipment 13 to a destination equipment 14, regardless of the behavior of the rest of the network, each virtual link having its own transfer time,
- a path fixed on the network,
- a unique identifier.

Figure 3:
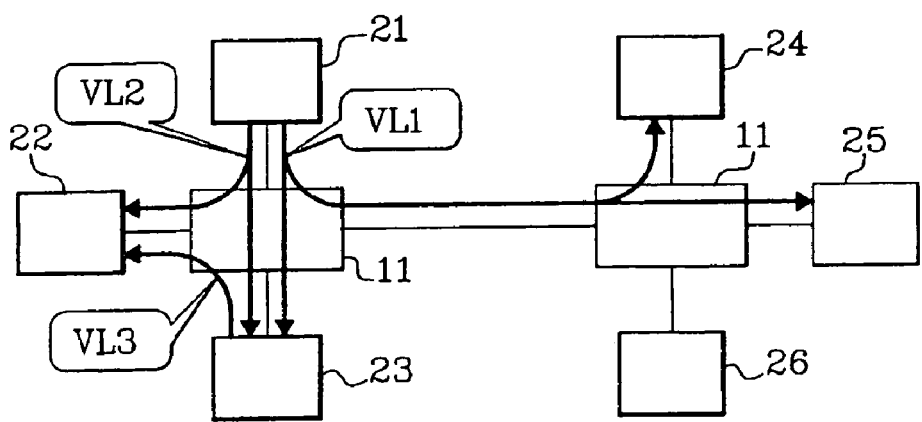
FIG. 3 illustrates an Ethernet network according to known art in which several virtual links are shown.

A network subscriber may comprise several virtual links VL1, VL2, VL3, as shown in FIG. 3. We have:
- a virtual link VL1 from equipment 21 to equipment 23, 24 and 25,
- a virtual link VL2 from equipment 21 to equipment 22 and 23,
- a virtual link VL3 from equipment 23 to equipment 22.

When equipment 21 wants to send a packet to equipment 23, 24 and 25, it sends a packet on the virtual link VL1. When it wants to send a packet to equipment 22 and 23, it sends a packet on the virtual link VL2.

The difference between virtual links VL1 and VL2 is identified by the destination identifier in the packet. On the network, the virtual link to which a packet belongs is determined by the identifier of the virtual link in the packet.

A switch uses a static configuration table to determine the virtual links that it is required to switch, and the allowable number of packets for a virtual link.

The virtual link concept is a means of fixing communications between equipment by configuring routes and passbands allocated to the virtual links. Thus, the flow formed by a virtual link is sure to be not disturbed by other flows sharing the same physical links all along its route in the network.

Furthermore, the virtual link concept enables central flow management, to make sure that the sum of the passbands allocated to virtual links on the same physical link does not exceed the capacities of the technology of this physical link. In the above example, the sum of the passbands of virtual links VL1 and VL2 must be less than the transmission capacity of the physical link from equipment 21.

Therefore, a virtual link is a conceptual representation of a link from a transmitter equipment to one or several items of receiver equipment that have the following characteristics:

fixed and predetermined route on the network, fixed and guaranteed passband, maximum guaranteed end to end latency explicit identification in a multidestination or "multicast" type Ethernet frame (multidestination MAC address) and this identification is kept when passing through one or more switches.

Figure 4:
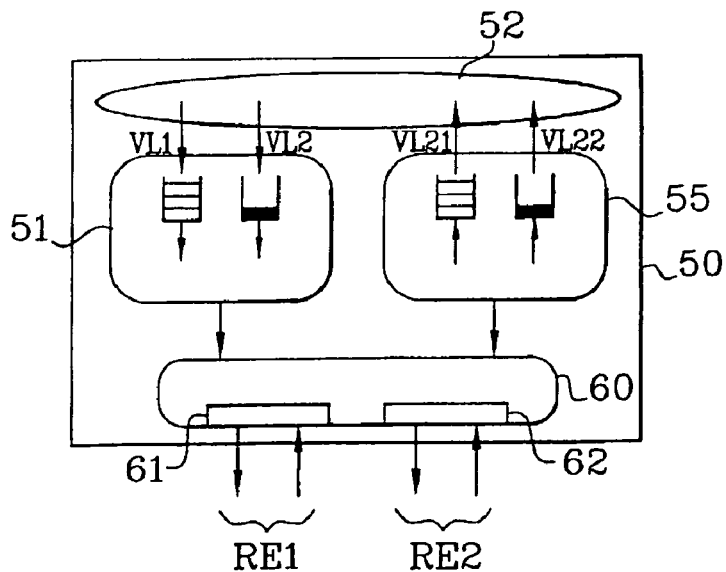
FIG. 4 illustrates services used in the process according to the invention.

As illustrated in FIG. 4, the process according to the invention is then characterized by the implementation of several services in each subscriber equipment 50:

a transmission service, the role of which is to enable an application 52 to access virtual links in transmission (virtual links VL1 and VL2). This service multiplexes virtual links towards a physical link through an Ethernet interface, and for each virtual link sends packets as a function of the passband allocated to the virtual link.

A reception service 55 that decodes frames (virtual links VL21 and VL22), checks their format and makes useful data available to applications.

In these transmission and reception services, the application may treat a virtual link like a queue.

Other protection services help to guard against some network failures.

A service for protection of a passband in the switch, which for each incoming virtual link is capable of checking the time characteristics of packets (spacing between packets, the consumed passband). If the allowable characteristics are exceeded, the packets are simply destroyed to prevent a failure in a transmitter or a virtual link from adversely affecting traffic in other virtual links starting from this switch.

A subscriber network redundancy service 60 that sends and receives each frame on the two elementary networks RE1 and RE2, in order to implement network redundancy. This network duplication: in two elementary networks RE1 and RE2, that is transparent for applications, provides a means of guarding against a failure in a switch or an interface (it does not replace system level redundancy). This network redundancy service 60 is connected to at least one first Ethernet interface 61 with the elementary network RE1, and a second Ethernet interface 62 with the elementary network RE2.

As shown in FIG. 5, the equipment in the process according to the invention to obtain redundancy of virtual links on the physical layer comprises at least two physical interfaces, so that they can be connected to at least two independent elementary networks RE1 and RE2. Their communication stacks include redundancy mechanisms that enable:

sending an identical frame on the elementary networks RE1 and RE2, selecting the first valid received frame.

Therefore, in this embodiment, the process according to the invention used in the subscriber equipment and applied by a virtual link onto the network are such that:

in transmission, for each frame received from the communication stack:

a numbering field is added so that a counter numbers the frame corresponding to each virtual link, this frame is sent onto the elementary networks RE1 and RE2.

in reception, for each frame assigned to a virtual link:

the frame number is stored, this frame is accepted if this number has not already been received, and if it is received it is destroyed.

FIG. 6A illustrates this embodiment of the process according to the invention in transmission, and 6B illustrates it in reception.

FIG. 6A illustrates the following in sequence:

addition of a numbering field on the IP/UDP/data assembly, numbering of the frame for each virtual link, send the frame to each Ethernet controller that formats it as an IEEE 802.3 frame.

Numbering is done by virtual link, and the same number can be used for two different virtual links.

FIG. 6B shows the following in sequence:

for each virtual link, verification of the number in the numbering field, the frame is eliminated if the number has already been received, otherwise the frame is sent to the higher layer.

The counter field can be small, and when the counter reaches its-maximum value, frame numbering restarts from zero.

Obviously, numerous modifications and variations of the present invention are possible in light of the above teachings. It is therefore to be understood that within the scope of the appended claims, the present invention may be practiced otherwise than as specifically described herein.

The invention claimed is:

1. A process for implementing a redundant switched full-duplex Ethernet type communication network including at least two independent elementary networks, each elementary network including at least one source subscriber equipment and at least one destination subscriber equipment, connected to each other through at least one physical link through at least one switch, each equipment being connected to each of these elementary networks, the process comprising:

performing a frame by frame redundancy on each elementary network, wherein the performing the frame by frame redundancy includes:

transmitting frames on the elementary network;

receiving the transmitted frames on the elementary network;

limiting the transfer time from a source equipment to one or more destination equipment; and determining, using a static configuration table, the virtual links that each switch is required to switch and an allowable number of packets for a virtual link.

2. A process according to claim 1, wherein there are two elementary networks.

3. A process according to claim 1, wherein a virtual link provides a link from the source equipment to the at least one destination equipment.

4. A process according to claim 3, wherein a virtual link number is accepted in the numbering field.

5. A process according to claim 3, wherein the virtual link has:

a transfer direction, the virtual link being single directional; a fixed passband; a maximum guaranteed time for transfer of packets from the source equipment to the destination equipment; a fixed path on the network; and a unique identifier.

6. The process according to claim 5 implementing a service for protection of a passband in the switch, which for each incoming virtual link is capable of checking time characteristics of packets, the packets being destroyed if allowable time characteristics are exceeded.

7. The process according to claim 3, wherein the steps used in the subscriber equipment and applied by a virtual link onto the network are such that:
   in transmission, for each frame received from a communication stack:
   adding a numbering field so that a counter numbers the frame corresponding to each virtual link, and
   sending the frame onto the elementary networks;
   in reception, for each frame assigned to a virtual link:
   storing the frame number, and
   accepting the frame if the frame number has not already been received, and if it has been received, destroying the frame.

8. The process according to claim 7, wherein the same frame number can be used for two different virtual links.

9. The process according to claim 3, wherein the implementation of several services in each subscriber equipment includes:
   a transmission service, the role of which is to enable an application to access virtual links in transmission, wherein this service multiplexes virtual links towards a physical link through an Ethernet interface, and for each virtual link sends packets as a function of the passband allocated to the virtual link, and
   a reception service that decodes frames, checks the format of the frame and makes useful data available to applications.

10. The process according to claim 9, wherein the application treats each virtual link as a queue.

11. A process according to claim 1 used for implementation of a redundant switched full-duplex Ethernet type communication network in avionics.

12. The process according to claim 1, further comprising:
   adding a numbering field in each frame transmitted through the switch to insert a frame number so that each frame is identifiable in time.

13. The process according to claim 12, further comprising:
   sending each identifiable frame with the added numbering field on each of the elementary networks.

14. The process according to claim 12, further comprising:
   storing a received frame number that was added to a sent frame.

15. The process according to claim 14, further comprising:
   accepting the received frame only within a predetermined time window if its frame number has not already been received during the predetermined time window.

16. The process according to claim 15, wherein the at least one source subscriber equipment and the at least one destination subscriber equipment are connected to each other through the at least one physical link through at least two switches which are interconnected to each other and each connected to at least one subscriber equipment.

* * * * *